Patented Jan. 16, 1923.

1,442,372

UNITED STATES PATENT OFFICE.

LEO WALLERSTEIN, OF NEW YORK, N. Y.

ABSORPTIVE MATERIAL AND PROCESS OF PRODUCING THE SAME.

No Drawing. Application filed November 2, 1918. Serial No. 260,820.

*To all whom it may concern:*

Be it known that I, LEO WALLERSTEIN, a citizen of the United States, residing at New York, county of New York, and State of New York, have invented certain new and useful Improvements in Absorptive Materials and Processes of Producing the Same, fully described and represented in the following specification.

This invention relates to a novel absorptive material and a process of producing the same.

Carbons have heretofore been principally employed for absorptive processes and those more particularly employed in gas absorption have usually been charcoal obtained by charring either vegetable fiber, such as wood, or animal matter, such as blood. Commercially speaking, qualities which are desirable in gas absorptive material are hardness and density combined with such degree of porosity as renders the carbon readily permeable. Dense carbons, relatively speaking, are economical to use because they occupy comparatively small space and the quality of hardness renders them less liable to powdering during use.

Some of the carbons produced by charring animal and vegetable matter present fairly high absorptive properties, but these coals. in the main, are objectionable because of their lack of density which makes them bulky and because of their softness and friability.

The present invention has for its object to produce a novel absorptive material in which the qualities of density and hardness, combined with excellent absorptive power are present and in which these qualities are controllable, so that, within limits, they may be present in any desired degree.

The present invention further extends to a novel process or processes for producing the material referred to.

The novel absorptive material having the qualities of density, hardness and high gas absorptive power, which qualities are controllable, may be obtained by charring, under proper conditions, a phenol condensation product. Such charred condensation product will produce a hard, dense carbon or coal which has high absorptive power and, if the conditions of treatment are properly varied, the hardness, density and absorptive power of this carbon may be varied and varied independently of each other, thus making it possible to produce an absorptive carbon or coal which is adaptable for a wide range of commercial uses. Under some conditions the phenol condensation product, before being charred, may be combined or united with carbons or other organic matter which will increase the porosity of the final product, the carbon resulting after proper treatment and charring also presenting controllable qualities of hardness, density and high absorptive power. Such carbons have the advantage of cheapness in manufacture and of being available for many commercial purposes.

The specific ingredients and the specific steps by which this improved absorptive material is produced, may be varied, and will be varied according to the kind of material desired or the use for which it is intended. For instance, when a phenol condensation product is employed, different phenols may be used. Excellent material for gas absorptive purpose has been obtained from the use of resorcinol, a condensation product being obtained by subjecting the resorcinol to the action of a condensing reagent. A condensing reagent which has been successfully employed is formaldehyde, though substitutes for formaldehyde may be used, provided such substitutes produce a phenol condensation product which can be carbonized or charred. According to one specific process which has been successfully carried out, resorcinol is dissolved in a forty percent formaldehyde solution, the proportions being about 100 grams of resorcinol to 110 grams of the solution. The mixture is then allowed to harden, the hardening process, if necessary, or desirable, being expedited by carrying it on in the presence of a catalyzing agent, such, for instance, as the normal sodium hydrate. Where a mixture such as indicated is used, good results are obtained by adding as a catalyzing agent 20 cc. of the normal sodium hydrate.

As has been indicated, absorptive material may, for many purposes, be improved or at least cheapened without detriment, by employing organic matter in connection therewith, as, for instance, a good grade or ordinary charcoal. Where charcoal is to be used the form in which it is used may be varied according to the requirements, but excellent results have been obtained by using it in a powder or sand-like form. The results referred to were obtained by mixing powdered charcoal with the resorcinol and formaldehyde mixture in sufficient quantity to produce a stiff paste or dough, this being allowed to stand at room temperature, say, at about 50° C., until it set or formed a hard mass. If a very hard and dense carbon is desired, it is advantageous to subject the mass, after hardening, to a drying process at temperatures of say about 100° to 110° C., such drying process driving off the surplus moisture, uncombined formaldehyde, etc. The dry product is then carbonized, the carbonizing temperatures being, say, from 800° C. to 900° C. This carbonization step may be carried out in the usual way, as, for example, in a retort heated externally and in a non-oxidizing atmosphere. The material to be carbonized may be in any suitable form but where it consists of ordinary sized lumps, as is usually the case in making it as hereinbefore described, it need not be broken to smaller particles but may be retorted as a mass.

Excellent results may also be obtained by using cresol instead of resorcinol. Where cresol is used the hardening before referred to may well be carried out under pressure.

The porosity of the material may also be improved and the material cheapened by adding infusorial earth or similar substance, such infusorial earth being added either to the phenol condensation product or to a mixture of such product with carbons, such, for instance, as charcoal.

Under certain conditions, also, a material which can be charred or carbonized, such, for instance, as wood, may be impregnated with the phenol condensation product, and the material thus impregnated is charred or carbonized.

The materials so far described are of special value in processes involving the absorption of gases.

Excellent material for use as decolorizing agents may also be made according to the same processes. Where decolorizing material is desired, the carbon added to the phenol condensation product should be selected with special reference to its decolorizing qualities.

When it is desired to employ the material in granular form the resulting mass may be crushed or comminuted to granules of the size desired. When special forms of the absorptive material are required, such, for instance, as pencils, cylinders, or the like, the paste resulting from the mixture of the powdered matter with the phenol formaldehyde mixture may be made in such form prior to the drying and heating operations.

The material referred to combines, as has been said, the desired qualities of density, hardness, and high gas absorptive powers, and has the further advantage of comparative cheapness of manufacture.

What is claimed is:

1. A carbonized synthetic condensation product of a phenol having gas absorptive properties.

2. The process of producing a synthetic absorptive material consisting in carbonizing a condensation product of a phenol.

3. The process of making a material having absorptive properties, which consists in subjecting a phenol to the action of a condensing reagent, and then submitting the condensation product thus obtained to the action of heat to carbonize said condensation product.

4. The process of producing an absorptive material consisting in subjecting organic matter charged with a condensation product of a phenol to sufficient heat to carbonize the same.

5. The process of producing a gas absorptive material which consists in subjecting a phenol to the action of a formaldehyde condensing reagent and then subjecting the resulting condensation product to sufficient heat to carbonize the same.

6. The process of producing an absorptive product consisting in subjecting a phenol to the action of a formaldehyde condensing reagent, mixing organic matter therewith, and then subjecting the mixture to sufficient heat to carbonize the same.

7. The process of producing a gas absorptive material consisting in subjecting a phenol to the action of a formaldehyde condensing reagent, hardening in the presence of a catalyzing agent, and then subjecting the condensation product to sufficient heat to carbonize the same.

8. The process of producing an absorptive material consisting in subjecting a phenol to the action of a condensing reagent such as formaldehyde, mixing charcoal with said product, and then subjecting the mixture to sufficient heat to carbonize the same.

In testimony whereof, I have hereunto set my hand.

LEO WALLERSTEIN.